(12) United States Patent
Ash et al.

(10) Patent No.: US 10,240,820 B2
(45) Date of Patent: Mar. 26, 2019

(54) CLAMP FOR SECURING AND ELECTRICALLY BONDING SOLAR PANELS TO A RAIL SUPPORT

(71) Applicant: Ironridge, Inc., Hayward, CA (US)

(72) Inventors: Jon Ash, Phoenix, AZ (US); Shawn J. Meine, Phoenix, AZ (US); David Taggart, San Carlos, CA (US)

(73) Assignee: Ironridge, Inc., Hayward, CA (US)

( * ) Notice: Subject to any disclaimer, the term of this patent is extended or adjusted under 35 U.S.C. 154(b) by 0 days.

(21) Appl. No.: 15/081,369

(22) Filed: Mar. 25, 2016

(65) Prior Publication Data

US 2016/0282018 A1 Sep. 29, 2016

Related U.S. Application Data

(60) Provisional application No. 62/137,903, filed on Mar. 25, 2015.

(51) Int. Cl.
| | |
|---|---|
| *F24S 25/634* | (2018.01) |
| *F24S 25/636* | (2018.01) |
| *H02S 20/23* | (2014.01) |
| *F24S 25/632* | (2018.01) |
| *F24S 25/30* | (2018.01) |
| *F24S 25/60* | (2018.01) |
| *F24S 25/00* | (2018.01) |

(52) U.S. Cl.
CPC .............. *F24S 25/636* (2018.05); *F24S 25/30* (2018.05); *F24S 25/632* (2018.05); *F24S 25/634* (2018.05); *H02S 20/23* (2014.12); *F24S 2025/6008* (2018.05); *F24S 2025/801* (2018.05); *F24S 2025/807* (2018.05); *Y02B 10/12* (2013.01); *Y02B 10/20* (2013.01); *Y02E 10/47* (2013.01)

(58) Field of Classification Search
CPC .......... H02S 20/23; H02S 40/34; F24J 2/5203; F24J 2/5254; F24J 2/5256; F24J 2002/4672; F24S 25/634; F24S 25/30; F24S 25/632; F24S 2025/6008; H01R 11/15; H01R 4/64
See application file for complete search history.

(56) References Cited

U.S. PATENT DOCUMENTS

| | | | | |
|---|---|---|---|---|
| 2,467,604 | A | * | 4/1949 | Tinnerman ................. B64C 1/06 24/563 |
| 2,565,636 | A | * | 8/1951 | Tinnerman ............... F16B 2/241 24/336 |
| 3,122,604 | A | * | 2/1964 | Cook .................... H01R 4/4809 174/51 |

(Continued)

FOREIGN PATENT DOCUMENTS

| | | |
|---|---|---|
| DE | 202010007139 | 9/2010 |
| DE | 102010022472 A1 * | 12/2011 |

(Continued)

*Primary Examiner* — Robert Canfield
*Assistant Examiner* — Charissa Ahmad
(74) *Attorney, Agent, or Firm* — Lance C. Venable; The Law Office of Lance C. Venable, PLLC

(57) ABSTRACT

In various representative aspects, an end clamp that mounts a bottom flange of a solar panel module to a rail support structure without requiring any tools for insertion while mechanically fastening and electrically bonding the solar panel module to the rail support structure. A method of installation is also provided.

6 Claims, 18 Drawing Sheets

(56) References Cited

U.S. PATENT DOCUMENTS

| | | | | |
|---|---|---|---|---|
| 3,528,050 | A * | 9/1970 | Hindenburg | H01R 4/4809 439/535 |
| 3,536,281 | A * | 10/1970 | Attore | F16B 7/0493 220/3.9 |
| 3,606,223 | A * | 9/1971 | Havener | H02G 3/126 220/3.9 |
| 3,720,395 | A * | 3/1973 | Schuplin | H02G 3/126 220/3.9 |
| 3,780,209 | A * | 12/1973 | Schuplin | H02G 3/125 174/51 |
| 3,810,069 | A * | 5/1974 | Jaconette, Jr. | F16B 37/041 439/97 |
| 4,406,505 | A * | 9/1983 | Avramovich | H01R 4/64 439/387 |
| 4,571,013 | A * | 2/1986 | Suffi | H01R 4/64 439/393 |
| 4,875,876 | A * | 10/1989 | O'Loughlin | H01R 4/38 439/431 |
| 4,993,959 | A * | 2/1991 | Randolph | H01R 4/64 439/855 |
| 5,451,167 | A * | 9/1995 | Zielinski | H01R 4/646 439/435 |
| 6,106,310 | A * | 8/2000 | Davis | H01R 4/26 439/92 |
| 6,389,658 | B1 * | 5/2002 | Pfaller | F16B 2/245 220/3.9 |
| 6,948,687 | B2 * | 9/2005 | Shatzky | F24J 2/045 248/49 |
| 7,686,625 | B1 * | 3/2010 | Dyer | H01R 4/64 439/857 |
| 8,025,508 | B2 * | 9/2011 | Parker | H01R 4/36 439/92 |
| 8,590,223 | B2 | 11/2013 | Kilgore et al. | |
| 8,875,401 | B2 | 11/2014 | Jolley | |
| 9,035,176 | B2 * | 5/2015 | Keller | H01R 4/64 136/244 |
| 9,065,191 | B2 * | 6/2015 | Martin | H01R 4/26 |
| 9,142,700 | B2 * | 9/2015 | Meine | H01L 31/18 |
| D740,113 | S * | 10/2015 | Olenick | F16B 2/241 D8/399 |
| 9,160,273 | B2 * | 10/2015 | Schuit | F16B 2/065 |
| 9,571,031 | B2 * | 2/2017 | Cavieres | F16B 2/241 |
| 9,671,136 | B2 * | 6/2017 | Ash | F24J 2/46 |
| 9,673,583 | B2 * | 6/2017 | Hudson | H01R 4/64 |
| 2010/0276558 | A1 * | 11/2010 | Faust | F24J 2/5205 248/222.14 |
| 2011/0001030 | A1 | 1/2011 | Hochreiter et al. | |
| 2012/0304556 | A1 * | 12/2012 | Teller | E04D 13/10 52/173.1 |
| 2013/0048056 | A1 * | 2/2013 | Kilgore | H01R 4/26 136/251 |
| 2013/0139869 | A1 * | 6/2013 | Nuernberger | H02S 20/00 136/251 |
| 2013/0220395 | A1 * | 8/2013 | Babineau, Jr. | F24J 2/5205 136/244 |
| 2013/0313209 | A1 | 11/2013 | Barth | |
| 2014/0010616 | A1 * | 1/2014 | Meine | F16B 2/12 411/190 |
| 2014/0037373 | A1 * | 2/2014 | Cui | H02S 20/00 403/379.5 |
| 2014/0042286 | A1 * | 2/2014 | Jaffari | F16B 2/065 248/316.4 |
| 2014/0169870 | A1 * | 6/2014 | Pressler | E04F 13/0814 403/374.1 |
| 2014/0175244 | A1 * | 6/2014 | West | F24J 2/5205 248/316.7 |
| 2015/0075587 | A1 * | 3/2015 | Veloso | F24J 2/5237 136/251 |
| 2015/0076304 | A1 * | 3/2015 | Hattori | F16B 21/075 248/231.81 |
| 2015/0311606 | A1 * | 10/2015 | Meine | F16B 2/12 439/100 |
| 2016/0282016 | A1 * | 9/2016 | Ash | F24J 2/46 |
| 2016/0285408 | A1 * | 9/2016 | Ash | H02S 20/23 |

FOREIGN PATENT DOCUMENTS

| | | | |
|---|---|---|---|
| DE | 202011108873 | | 3/2012 |
| DE | 102011118560 A1 * | | 5/2013 |
| DE | 102012001195 A1 * | | 7/2013 |
| EP | 508977 A1 * | 10/1992 | |
| JP | 09072057 A * | 3/1997 | F24J 2/045 |
| JP | 2011237030 A * | 11/2011 | F16B 5/065 |
| WO | WO 2013037384 A1 * | 3/2013 | |

* cited by examiner

CLAMP FOR SECURING AND ELECTRICALLY BONDING SOLAR PANELS TO A RAIL SUPPORT

BACKGROUND OF INVENTION

Field of the Invention

The present invention relates generally to providing an apparatus for securing a solar panel module to a rail support structure. More specifically, the invention relates to the use of an end clamp that mounts a bottom flange of a solar panel module to a rail support structure without requiring any tools for installation, while also mechanically fastening and electrically bonding the solar panel module to the rail support structure.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. Many of the assembly components require special tools or are generally difficult to install because they are utilized after the solar panels modules are arranged or positioned on their support elements.

Solar panel arrays can be installed using different rail support structures. One type of rail support structure utilizes a series of rails that are arranged in rows across a roof and fixed to flashings that are secured to the roof. The solar panels are then arranged in an array and secured to the top of these rails.

There are various ways to secure the solar panels to the rails. One type of rail support structure includes slots or guides along the top of the rail for receiving mid-clamps or similar mounting hardware used to couple and secure two solar panels to the rails. One reason mid-clamps are advantageous for securing the solar panels to the rails within the interior of the array is that they can secure multiple panels at the same time. This is normally accomplished by inserting an elongated bolt in the rail guide, placing a pair of the solar panels alongside the bolt and joining the panels by tightening a clamp plate to the bolt on top of the panels at the other end of the rail guide. A limitation of these types of mid-clamps is that they are exposed on top of the panels and can be aesthetically unsightly if used along the perimeter of the array. It is desirable to provide a clamp that not only secures the solar panels to the rails outer perimeter of the array, but is also easy to install, electrically grounds the solar panel to the rail guides, and is hidden from plain sight of the array thereby making the outer perimeter of the solar panel array more visibly appealing. The terms "clamp" and "end clamp" are used interchangeably as it applies to the present invention.

Existing clamps are either unsatisfying in providing a way to secure solar panel modules to rails with guides or slots located on the top of the rails. For example, U.S. Pat. No. 8,590,223 teaches a solar panel assembly attachment apparatus that utilizes a single piece clip that fits linearly within a rail guide and is used to secure a solar panel module to a rail. The device also includes a grounding clip having a barb that attaches to a flange on the solar panel module to ground the module to the rail. But unlike the present invention, this device is secured to the rail guide by utilizing one or more flexible wings that are removably snap-fit into a slot of an elongated and rigid strut. This makes the manufacture and installation of this device more complex than the present invention.

Another example of a clamp that is used to secure a solar panel module to support rails with guides or slots located on the top of the rail structures is German patent DE 20-2011108873. This patent teaches an end clamp that is inserted within a rail guide as shown in FIG. 2B. One end of the clamp secures a bottom flange of a solar panel to the rail, while the other end is secured outside of the perimeter of the solar panel array by way of a clamping screw. But unlike the present invention, this device does not include unidirectional barbs that act as both grounding features and securing mechanisms that prevent the clamp from coming off the flange of the solar panel once engaged with it. The present invention overcomes the limitations in both of these pieces of prior art and provides a solution that is both easy to, install, use, and manufacture.

SUMMARY OF THE INVENTION

The invention is summarized below only for purposes of introducing embodiments of the invention. The ultimate scope of the invention is to be limited only to the claims that follow the specification.

It is an object of this invention to provide a clamp for securing a solar panel module to a rail support structure on a residential roof.

It is a further object of this invention that the clamp fit within, and move bi-directionally along a rail guide of the rail support structure.

It is a further object of this invention that the clamp is a generally u-shaped body.

It is a further object of this invention that the u-shaped body includes a top and bottom jaw connected to opposite ends of a rear end.

It is a further object of this invention that the top and bottom jaws of the clamp can receive a flange of the solar panel module within the clamp.

It is a further object of this invention that the top jaw of the clamp has at least one raised portion for coupling and electrically bonding to the top surface of the flange of the solar panel module by having the raised portion penetrate an oxidation layer of the flange.

It is a further object of this invention that the bottom jaw is configured to fit within, and move bi-directionally along a guide of the rail support structure and couple and electrically bond to the rail support structure by penetrating an oxidation layer of the rail support structure.

It is a further object of this invention that the rear end of the clamp provides sufficient resilience to enable the top and bottom jaws of the clamp to secure the flange to the rail support by gripping the upper and lower surfaces of the flange.

It is a further object of this invention that the at least one raised portion tapers toward the rear end of the clamp at an acute angle with respect to the top jaw.

It is a further object of this invention that when the at least one raised portion is engaged with the flange of the solar panel module, the clamp can only move in one direction along the rail guide.

It is a further object of this invention that in an alternate embodiment, the bottom jaw is elongated and includes an aperture at the end of the bottom jaw.

It is a further object of the alternate embodiment of this invention to secure the end of the bottom jaw to the rail guide by way of a t-bolt that is inserted through the aperture and into the rail guide, and can be subsequently tightened using a nut.

It is a further object of this invention to provide a method of assembling a solar panel array utilizing the components described below.

A person with ordinary skill in the relevant art would know that any shape or size of the elements described below may be adopted as long as the end clamp can be used to secure solar panel modules to the rail support structures and provide a grounding path from the modules to the rail support structures. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
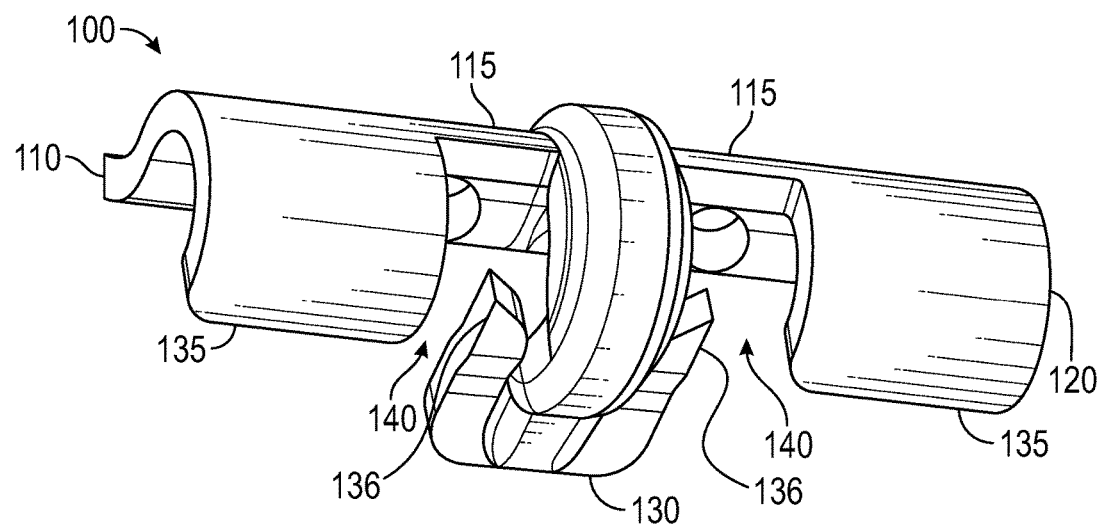
FIG. 1 illustrates a rear perspective view of an exemplary clamp.
Figure 2:
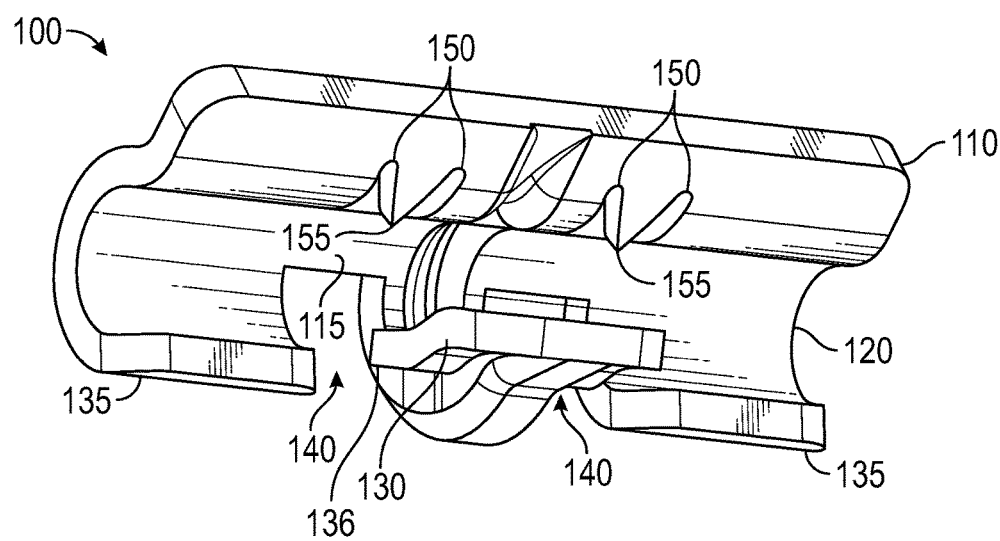
FIG. 2 illustrates a front perspective view of the clamp.
Figure 3:
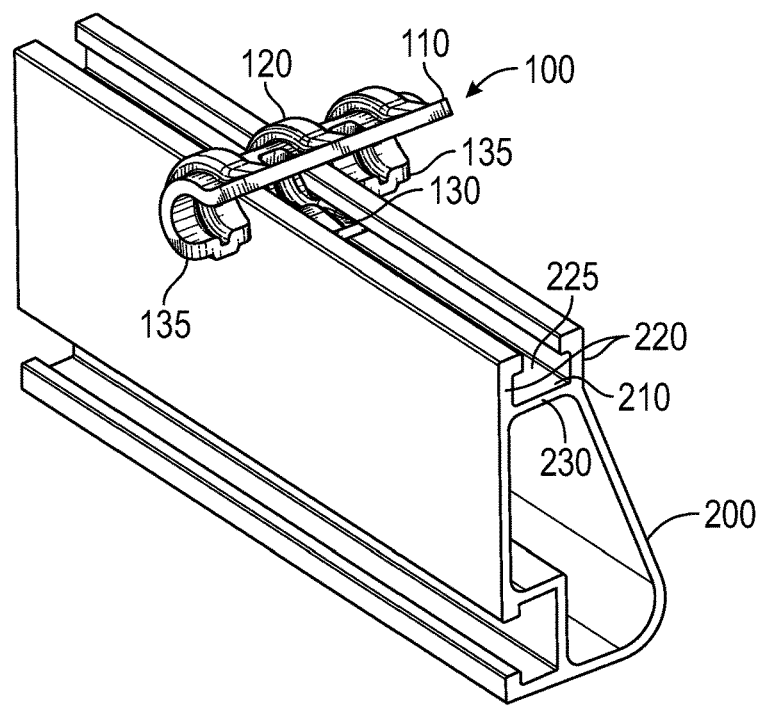
FIG. 3 illustrates a perspective view of the clamp inserted into a guide of a rail support structure.
Figure 4:
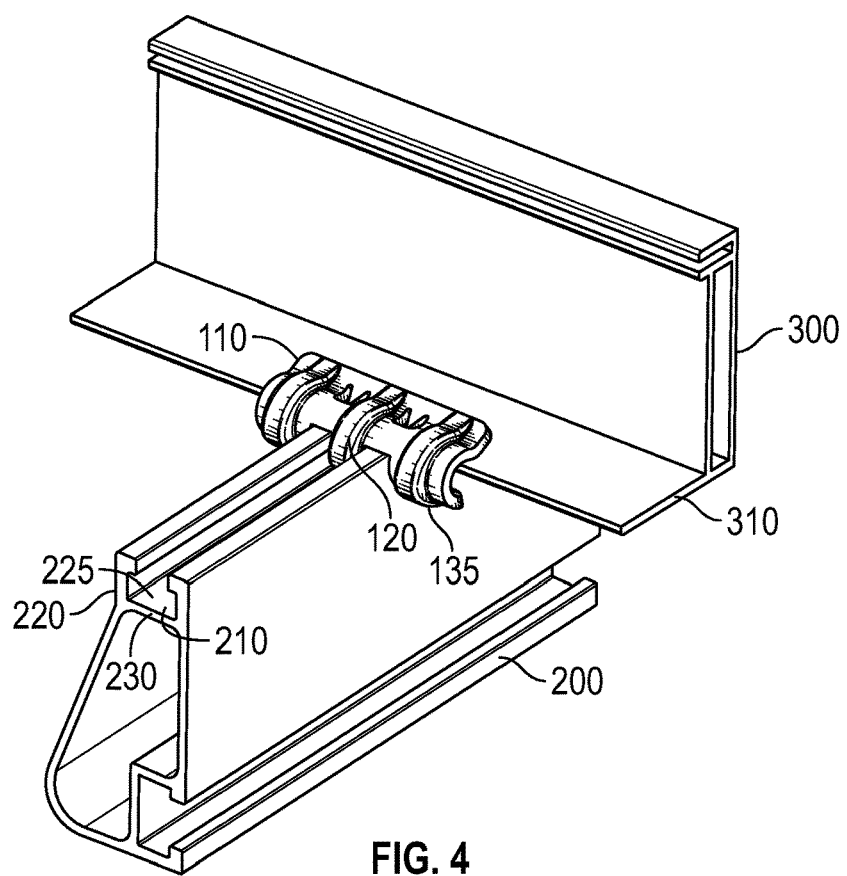
FIG. 4 illustrates a perspective view of the clamp secured between a flange of a solar panel module and the guide of the rail support structure.

FIGS. 1 and 2 show two perspective views of an end clamp 100 for use in fastening a solar panel module to a rail support structure 200 (as shown in FIGS. 3 and 4). The exemplary embodiment of the end clamp 100 is generally a c-shaped or u-shaped structure that includes a top jaw 110, a rear end 120, and a bottom jaw 130. The top and bottom jaws 110 and 130 are typically in the form of flanges, but can be of any suitable shape that forms a mouth-like opening with respect to the rear end 120. The end clamp 100 is typically made from an electrically conducting material. In this embodiment, a pair of bottom side flanges 135 are also included and are positioned on opposite sides of the bottom jaw 130. The bottom side flanges 135 provide added stability and gripping area of the flange 310 as discussed below. The rear end 120 is slightly flexible so that it allows a limited amount of angular movement of the top and bottom jaws 110 and 130 when they are pulled outward or recoil inward. A pair of apertures 140 are positioned between the two bottom side flanges 135. The apertures 140 extend from the terminal ends of the bottom side flanges 135 to rear portions 115 of the top jaw 110. Bottom jaw 130 includes at least one sharp edge 136 configured to penetrate an oxidation layer of the rail support structure 200. In this embodiment, two sharp edges 136 are shown on opposite sides of the bottom jaw 130 to provide multiple engagement points with the rail support structure 200.

FIG. 2 shows the front of the end clamp 100. The top jaw 110 includes raised portions 150 that protrude downward. A plurality of raised portions 150 is desired, but one raised portion 150 may be sufficient. The raised portion 150 preferably tapers to a sharp point 155. The raised portions 150 are directed toward the rear end 120 of the end clamp 100 so that the point 155 is at an acute angle with respect to the top jaw 110.

The purpose of the end clamp 100 is to secure a solar panel module to a rail support structure. FIGS. 3 and 4 show a typical configuration with a rail support structure 200 and a solar panel module 300 that includes a flange 310 on its lower end. The rail support 200 is normally secured to a flashing structure that has been previously installed on a roof (not shown) and includes a guide 210 on or near the top of the support 200 for receiving the end clamp 100.

Figure 5:
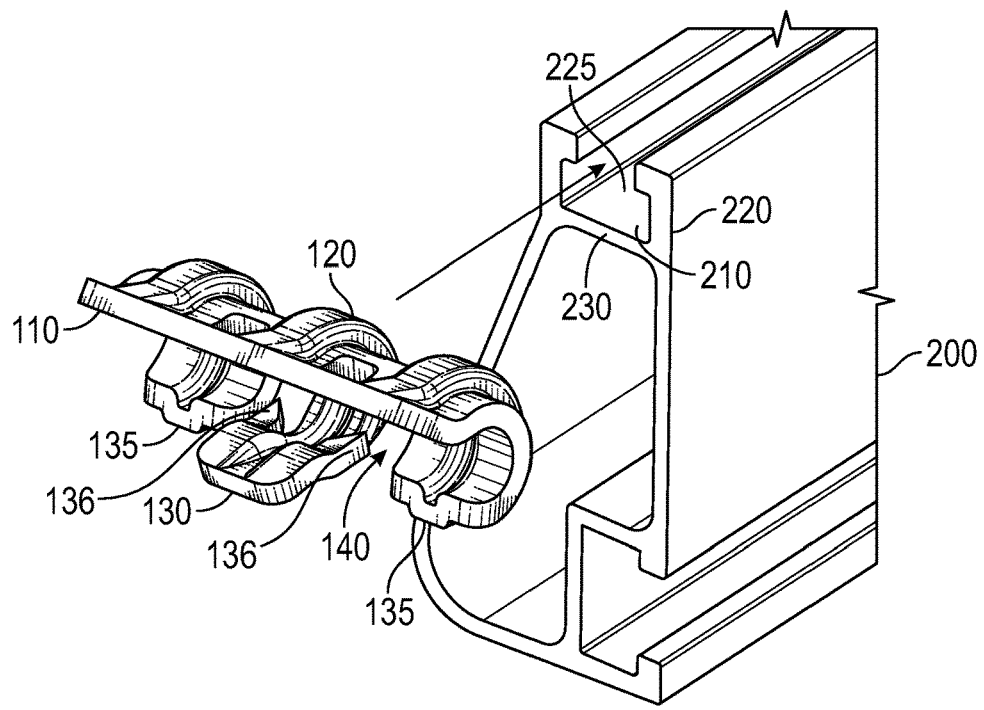
FIG. 5 illustrates a cross sectional view of the clamp securing the flange of the solar panel module to the guide of the rail support structure.
Figure 6:
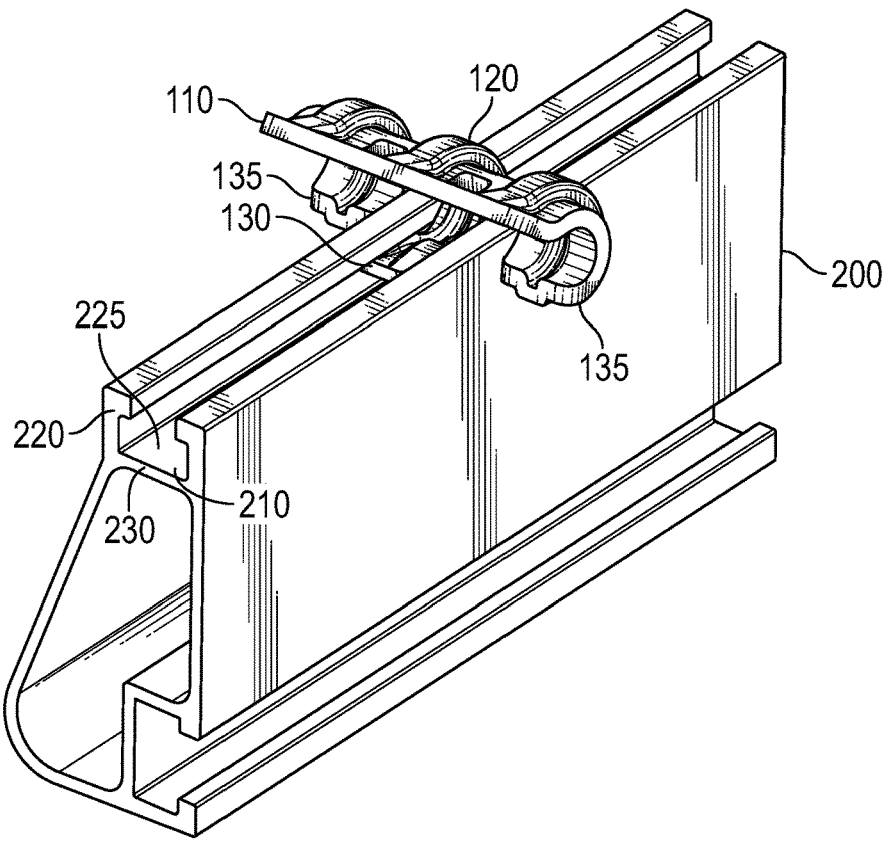
FIG. 6 illustrates cross-sectional view of the clamp along points 6-6 as shown in FIG. 5.

The process of securing the solar panel module 300 to the rail support 200 is accomplished by inserting the bottom jaw 130 of the end clamp 100 into an open end 225 of the guide 210 and enabling the apertures 140 to follow the contour of the upper and side walls 220 of the guide 210 as shown in FIGS. 5 and 6. The bottom side flanges 135 flank the outer portions of the side walls 220 as the end clamp 100 is inserted into the guide 210. An exemplary bottom jaw 130 will frictionally engage the inner walls 230 of the guide 210 while allowing the end clamp 100 to move bi-directionally along the guide 210. All of this can normally be accomplished without the use of any tools.

Figure 7:
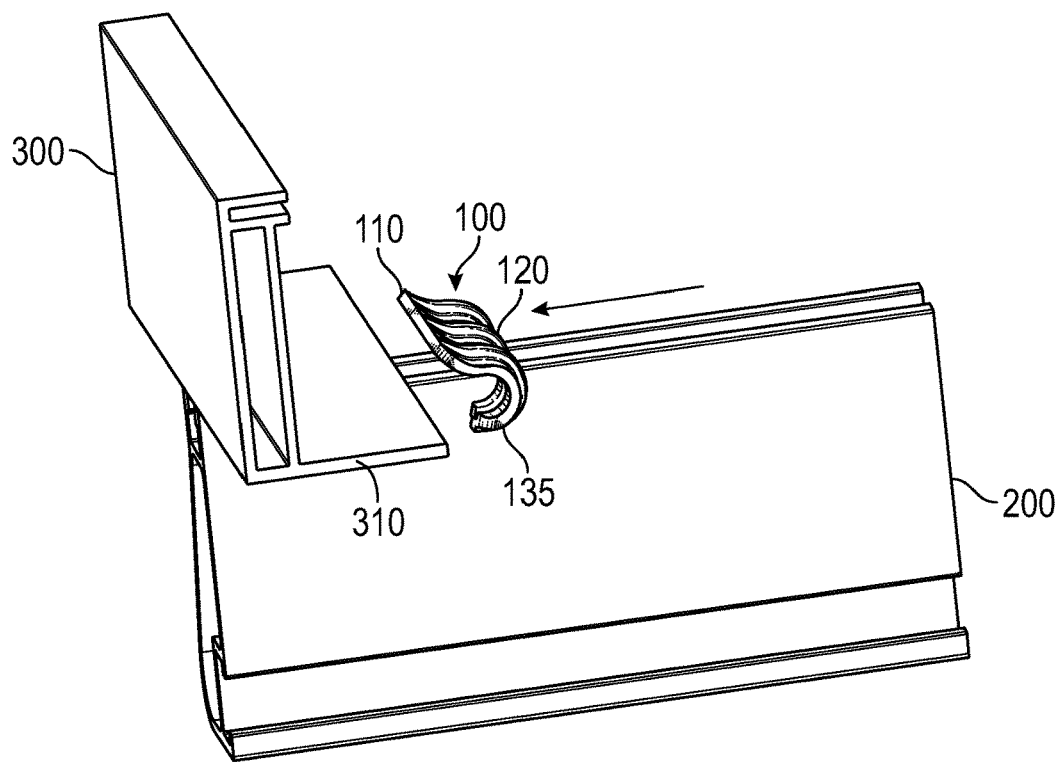
FIG. 7 illustrates an exploded view of the clamp as it moves toward the guide of the rail support structure.
Figure 8:
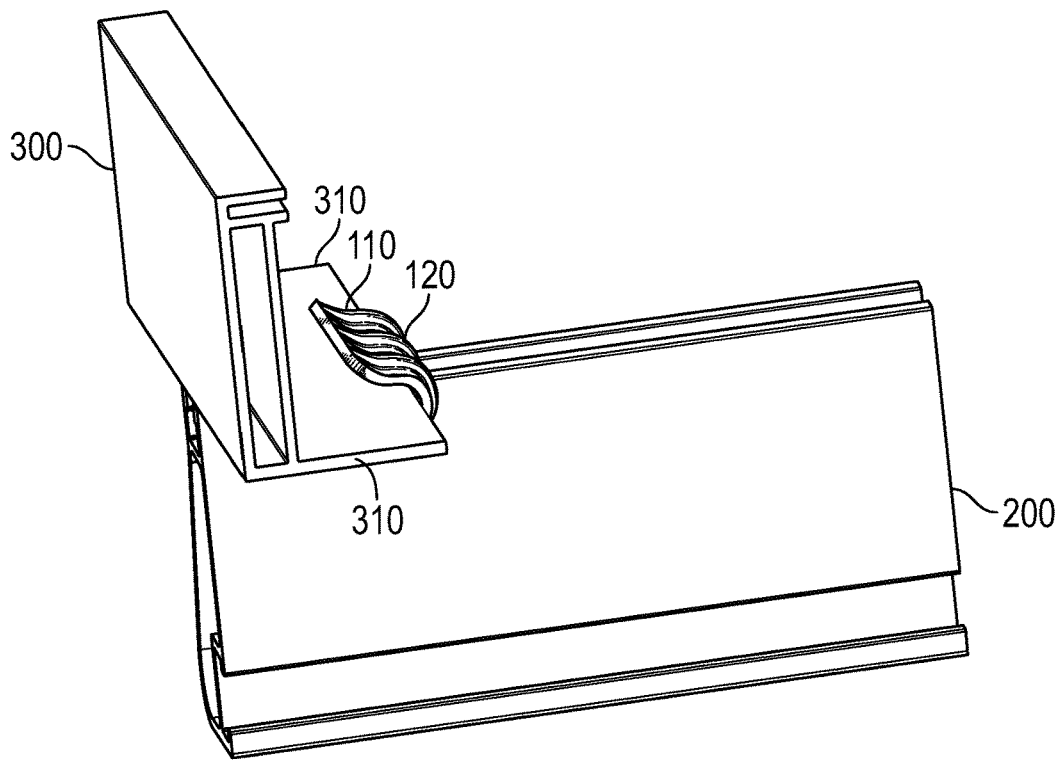
FIG. 8 is a reverse perspective view of FIG. 3.
Figure 9:
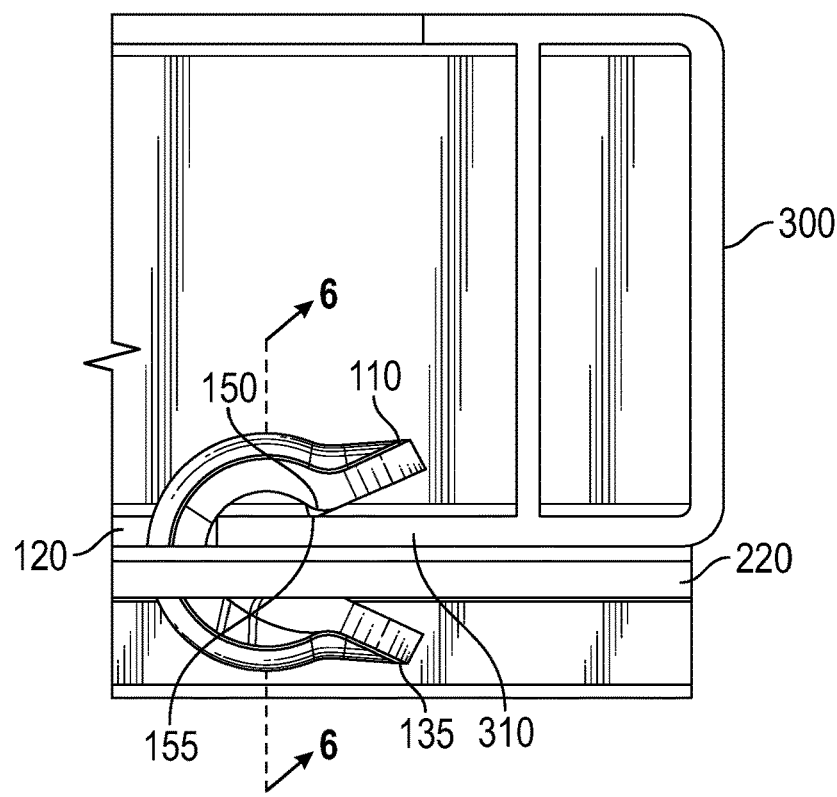
FIG. 9 illustrates the perspective view of FIG. 3 showing a solar panel module prior to placing it on top of the rail support structure.
Figure 10:
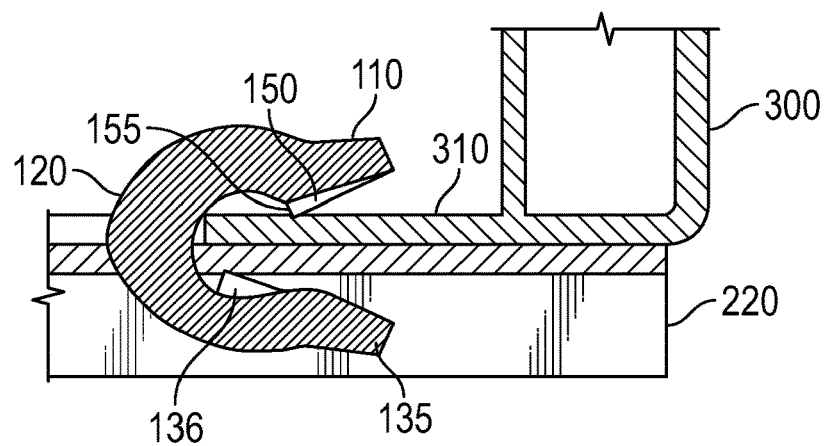
FIG. 10 illustrates the same view of FIG. 9 showing the clamp fully engaged with the lower flange of the solar panel module.
Figure 11:
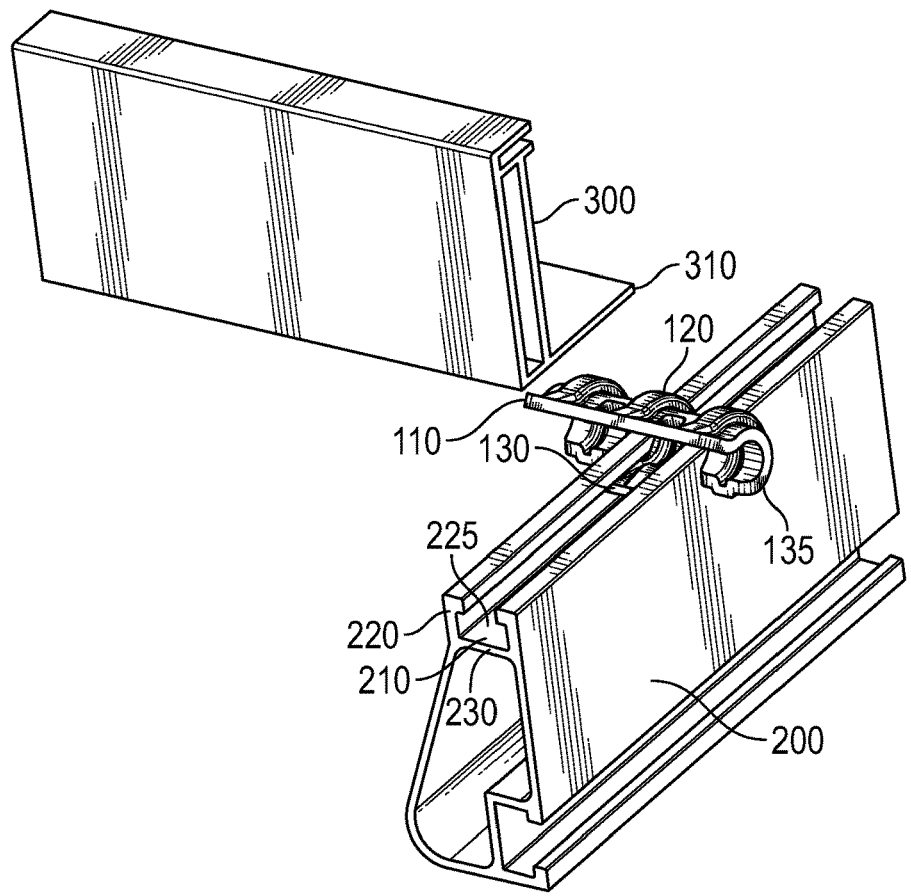
FIG. 11 illustrates a side view of the clamp as it moves toward the guide of the rail support structure.
Figure 14:
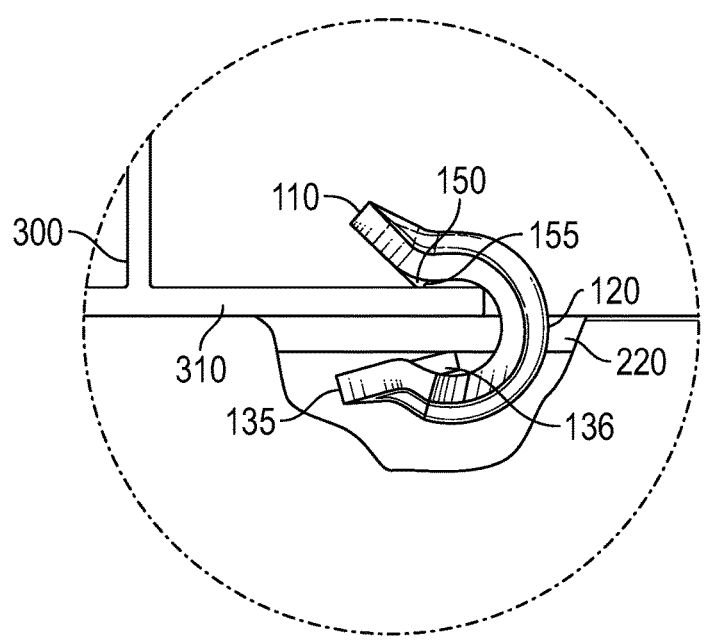
FIG. 14 illustrates a side view showing the raised portions on the clamp penetrating the surface of the bottom flange of the solar panel module and securing it to the guide.

As shown in FIGS. 7, 8, and 11, the solar panel module 300 is placed on top of the rail support 200 so that the lower flange 310 is substantially perpendicular to the guide 210. The end clamp 100 is then manually pushed along the guide 210 toward the lower flange 310 of the solar panel module 300. The space between the top jaw 110 and bottom jaw 130 is sufficient to allow the bidirectional movement to occur along the guide 210. As shown in FIGS. 9, 10, and 14, the end clamp 100 forms a tight grip of the lower flange 310 as the top jaw 110 of the end clamp 100 engages the top surface of the lower flange 310, and the bottom jaw 130 engages the bottom surface of the lower jaw 130. Preferably, the rear end 120 provides sufficient resiliency to enable the top jaw 110 and lower jaw 13 to provide an adequate gripping force to compress the lower flange 310 to the guide 210. Once engaged, the points 155 of the raised portions 150 are then deflected slightly upward toward the top jaw 110 and form a tight grip on the top surface of the lower flange 310. The slight deflection allows the end clamp 100 to continue to move along the guide 210 toward the solar panel module 300 until the lower flange 310 reaches the rear end 120 of the end clamp 100. As shown in FIGS. 9 10, and 14, once engaged, the sharp points 155 penetrate the outer surface layer of the lower flange 310, and the sharp edges 136 penetrate the outer surface layer of the side walls 220 and create a grounding path from the solar panel module 300 to the rail support 200 through the end clamp 100.

Once penetration of the surface layer occurs, the combination of the rearward-pointing angle of the raised portions 150 with the tightness of the gripping force formed between the top jaw 110 and the bottom jaw 130, allow the points 155 to resist any attempt to pull the end clamp 100 away from the solar panel module 300 essentially locking the solar panel module 300 in place. The end clamp 100 can be unlocked and moved backward along the guide 210 by pulling the top jaw 110 and the bottom jaw 130 apart so that the raised portions 150 disengage from the lower flange 310.

Figure 12:
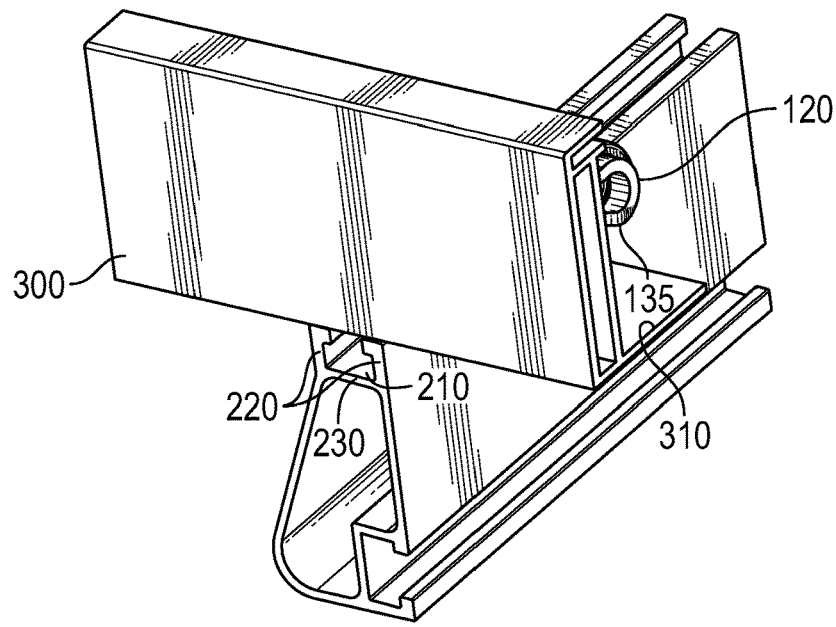
FIG. 12 illustrates side view of the clamp secured to the solar panel module.
Figure 13:
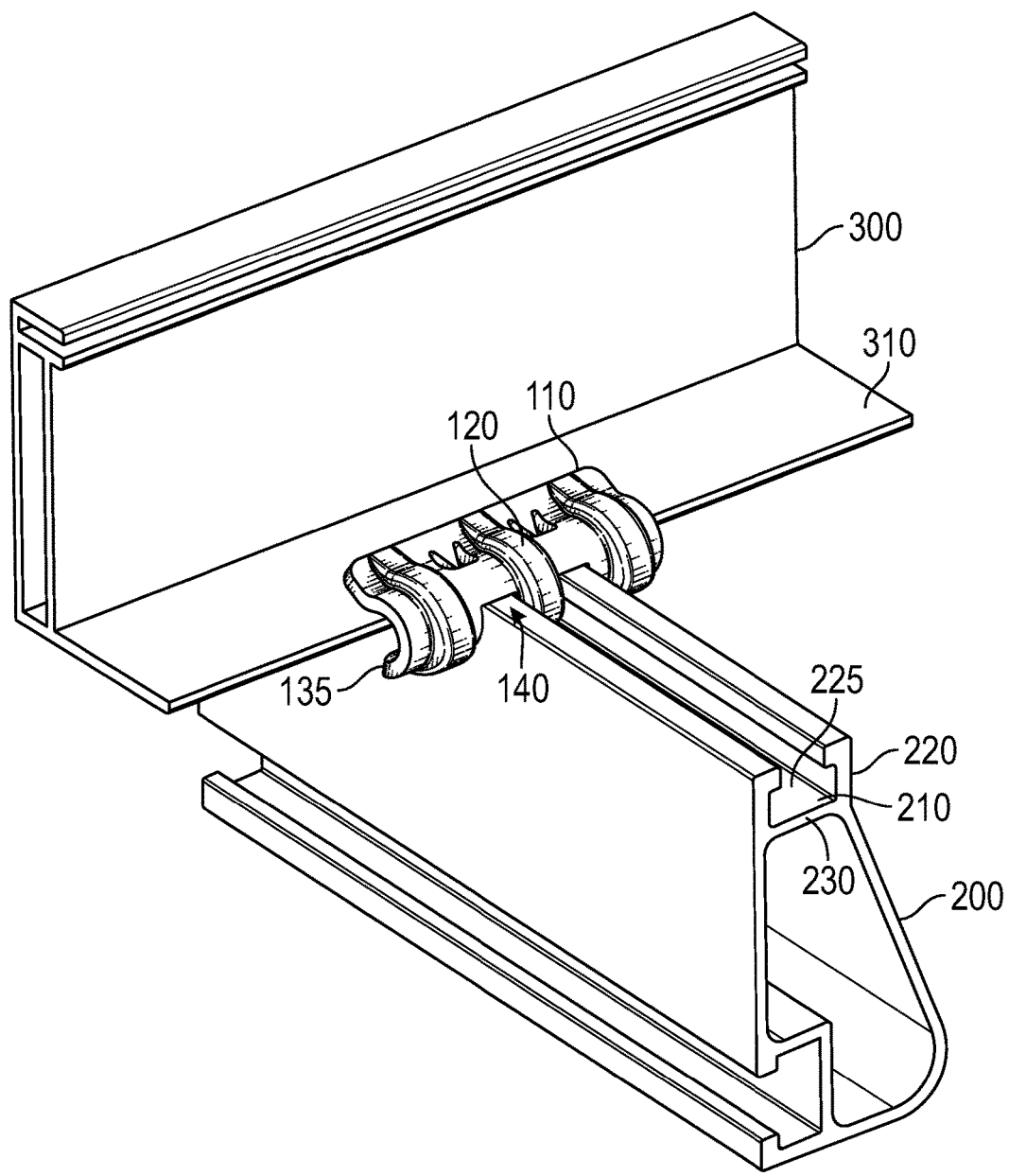
FIG. 13 illustrates a perspective view of a completed assembly of a solar panel module to a pair of rail support structures.
Figure 15:
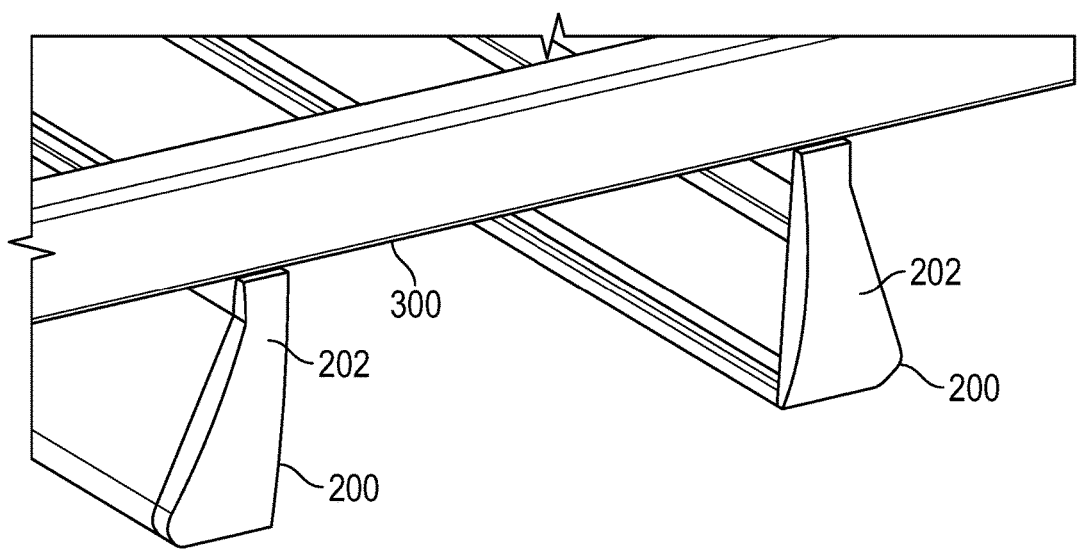
FIG. 15 illustrates a solar panel module positioned over two rail structures.

FIG. 13 shows a perspective view of the clamp 100 fully engaged and securing the solar panel module 300 to the rail support 200 and providing an electrical conducting path between the them. FIG. 12 shows a view from the opposite side of the solar panel module 300 and FIG. 15 shows the solar panel module 300 as it rests on two distinct rail supports 200 demonstrating that the end clamp 100 is hidden from plain view. This process is repeated until all end clamps 100 are installed. After the first row is installed, each subsequent row is installed by repeating the process described above.

Figure 16:
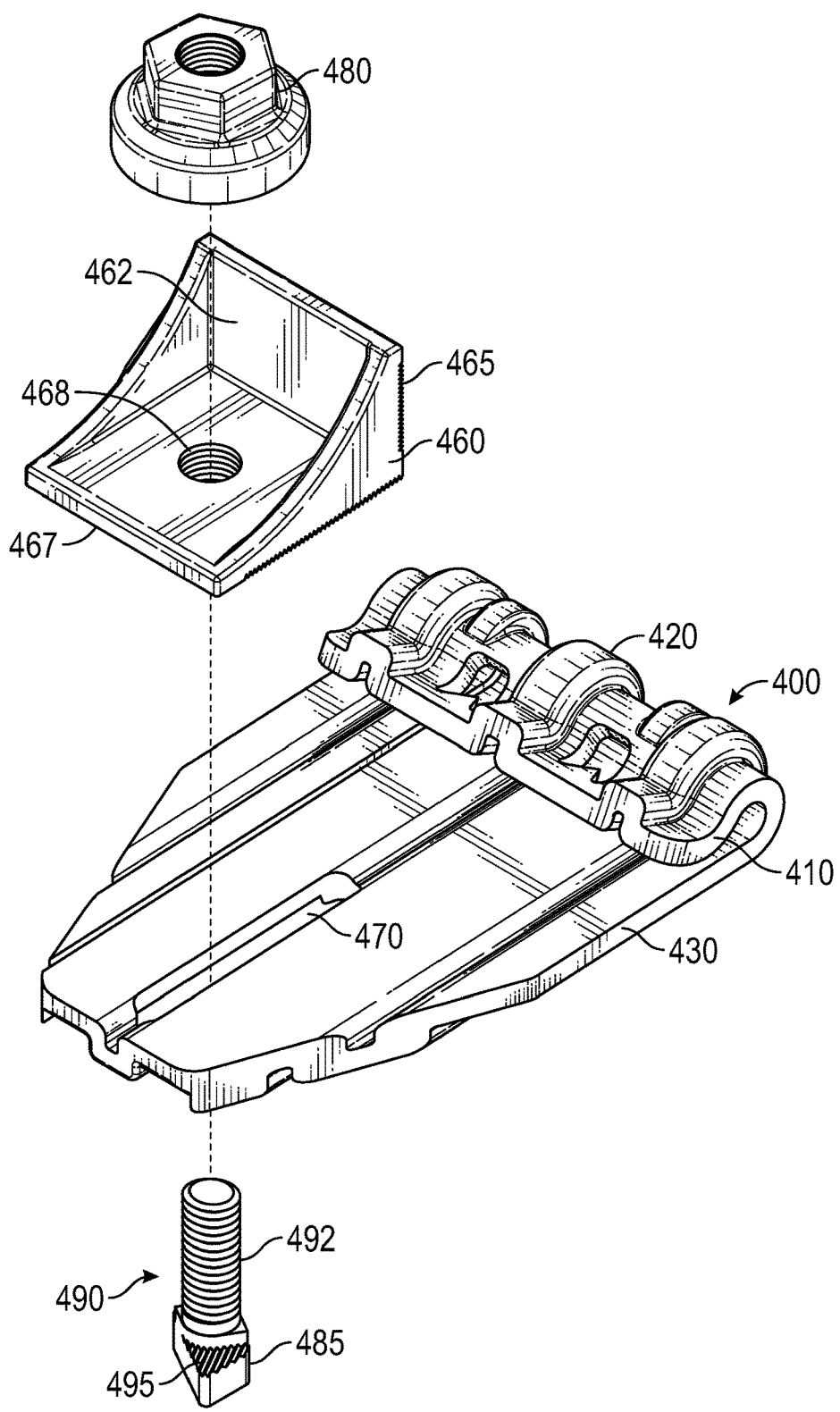
FIG. 16 illustrates an exploded view of an alternate embodiment of the end clamp with an elongated lower portion.

FIG. 16 shows an exploded view of an alternate end clamp 400. The end clamp 400 includes some of the same features as the end clamp 100 in terms of how it engages and secures the lower flange 310 on the solar panel module 300. But in this embodiment, the end clamp 400 provides an additional means to secure the end clamp 100 to the rail support 200. As in the previous end clamp 100, the end clamp 400 is also a generally c-shaped or u-shaped clamp that includes a top jaw 410, a rear end 420, and a bottom jaw 430. The top and bottom jaws 410 and 430 are typically in the form of flanges, but can be of any suitable shape that forms a mouth-like opening with respect to the rear end 420. The end clamp 400 is typically made from an electrically conducting material.

In this embodiment, the bottom jaw 430 is extended outward beyond the edge of the top jaw 410 and includes an aperture 470 for receiving a t-bolt 490 as shown in FIG. 15 to secure the end clamp 400 to the rail support 200. The t-bolt 490 is typically an elongated threaded bolt with a rectangular-shaped head on one end and includes raised portions 495 on the head that are used to grip the inside of the guide 210 of the rail support 200 as will be discussed below. The aperture 470 is typically positioned in the middle of the bottom jaw 430 and allows for the t-bolt 490 to be inserted and secured in various locations along the center of the bottom jaw 430. The t-bolt 490 is tightened using a nut 480.

An optional back support 460 is also included. An exemplary back support 460 is L-shaped and includes a vertical face 462 with ridges 465 and a horizontal face 467 with an aperture 468 for receiving the t-bolt 490.

Figure 16A:
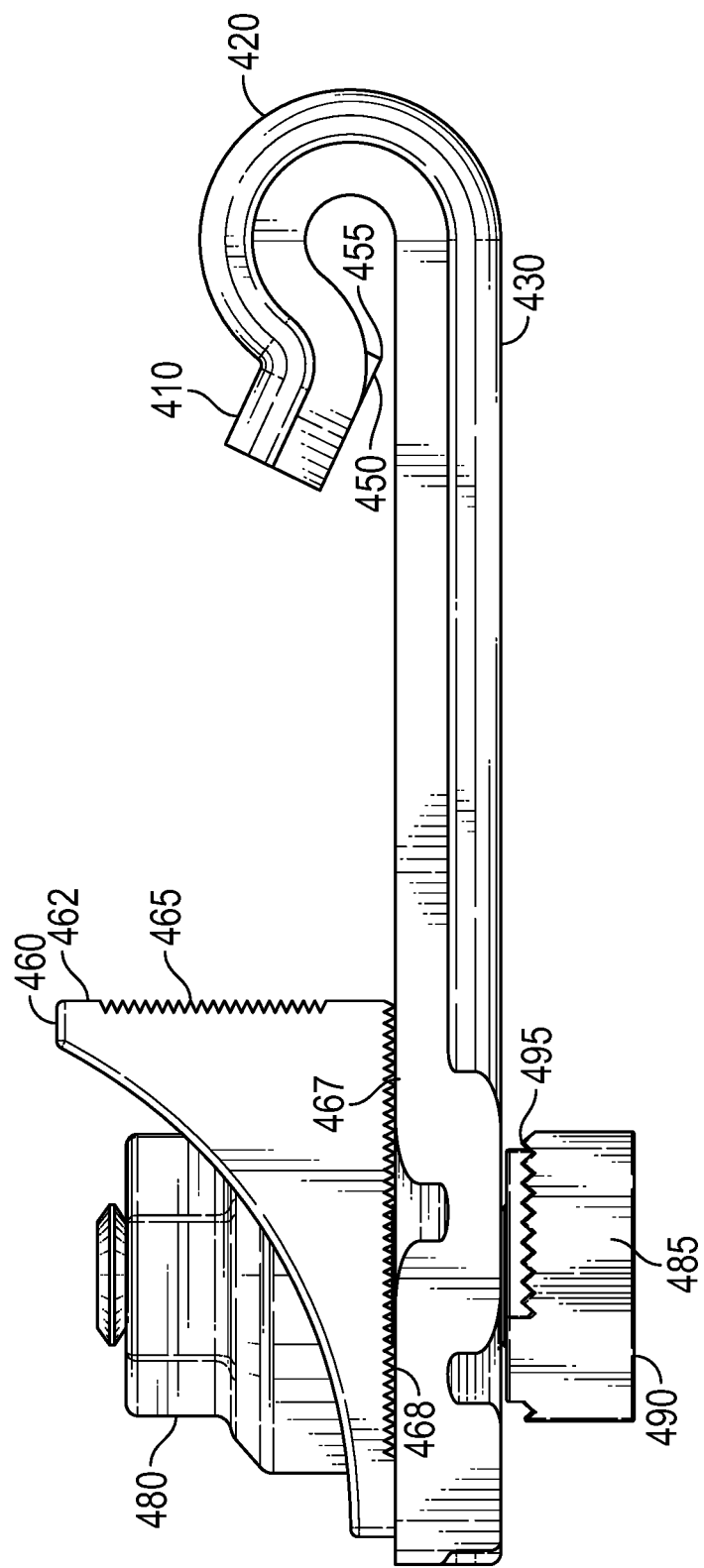
FIG. 16A illustrates a side view of the clamp.

FIG. 16A shows a side view of the end clamp 430, which also includes the raised portions 450 of top jaw 410 that protrudes downward. The structure of the raised portions 450 is the same as those shown in FIG. 2 for the first embodiment of the clamp 100. A plurality of raised portions 450 is desired, but one raised portion 450 is sufficient. The raised portions 450 preferably taper to a sharp point 455. As shown, the raised portion 450 is directed toward the rear end 420 of the end clamp 400 so that the point 455 is at an acute angle with respect to the top jaw 410.

Figure 16B:
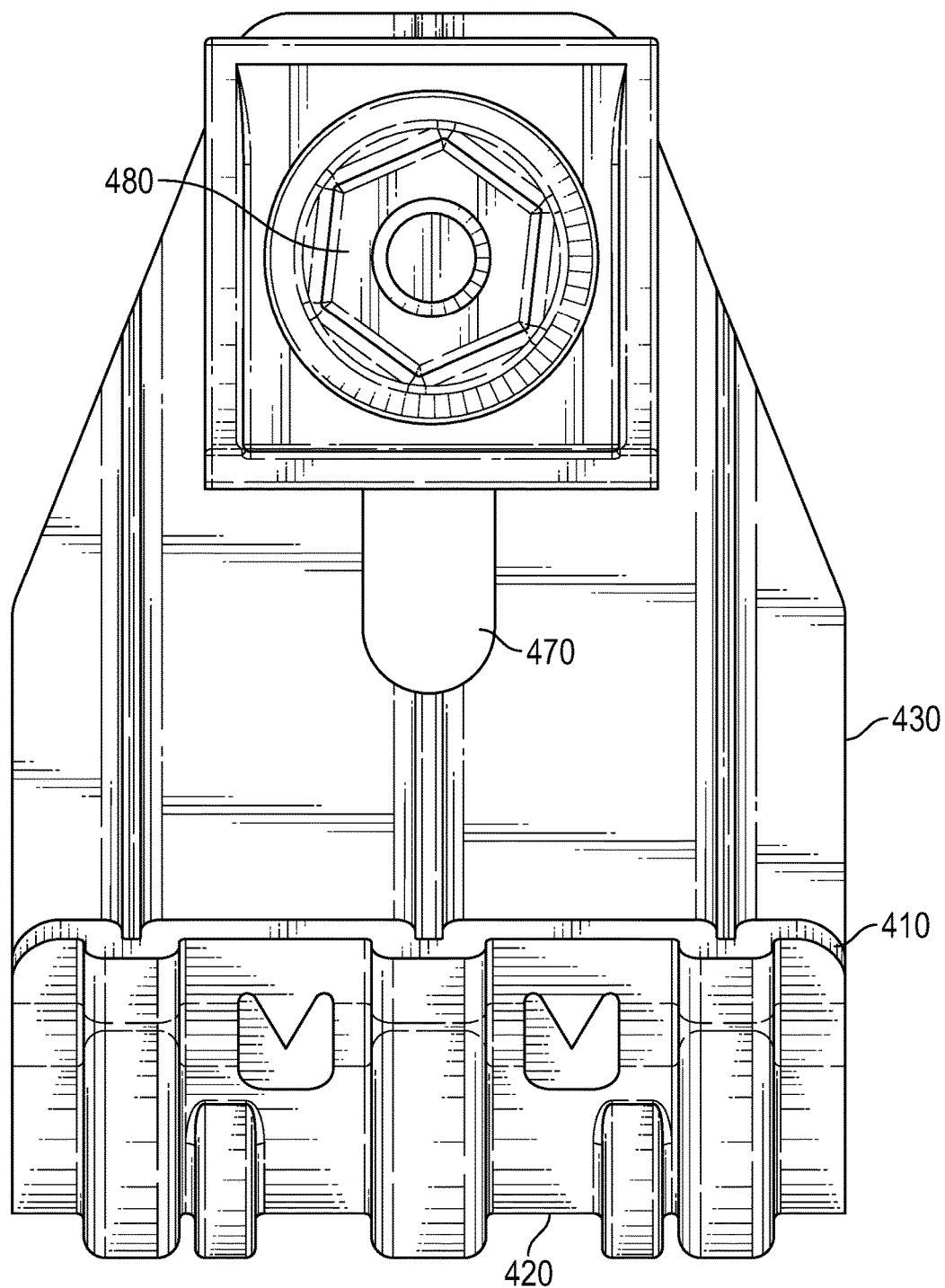
FIG. 16B illustrates a top view of the clamp.
Figure 16C:
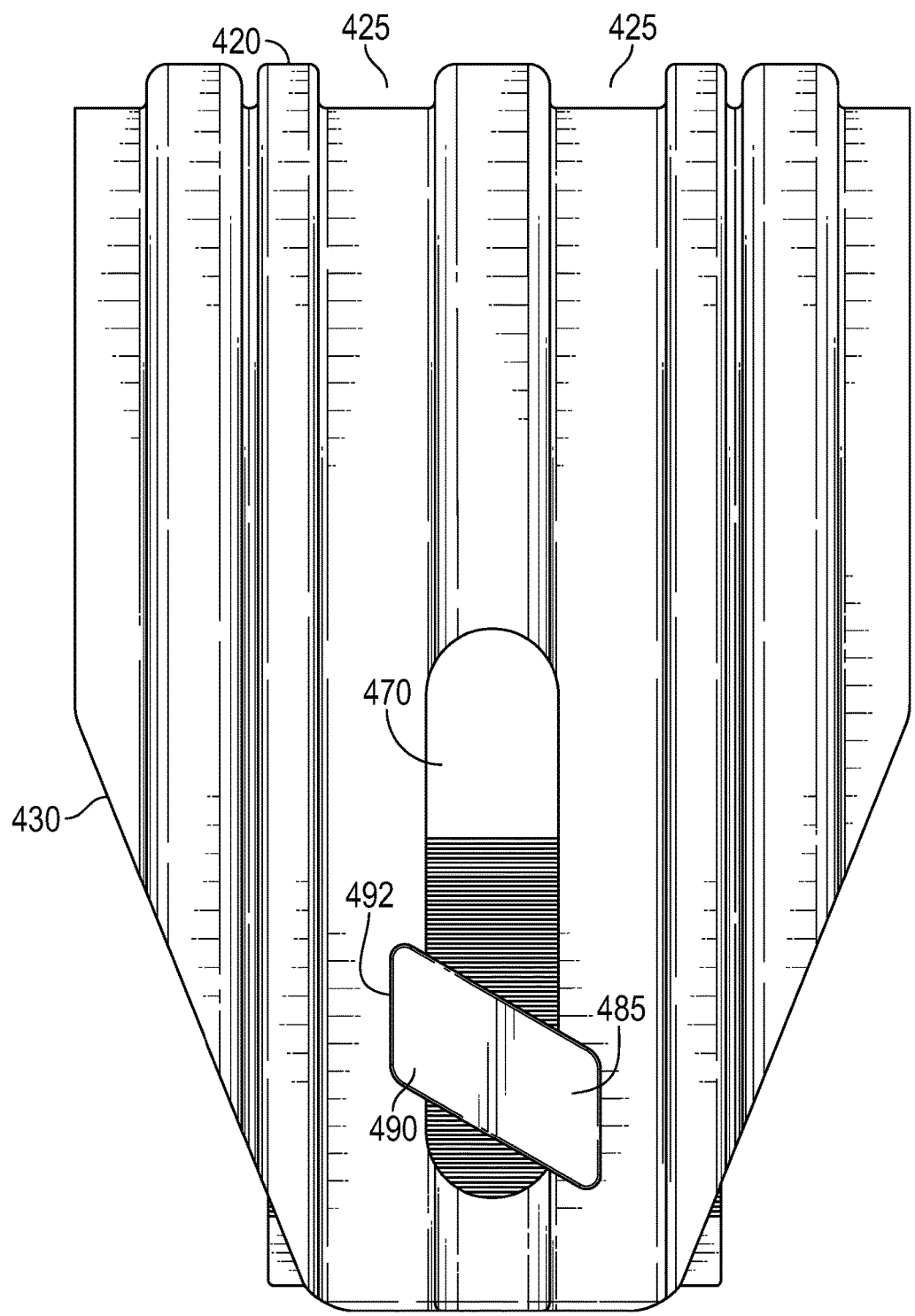
FIG. 16C illustrates a bottom view of the clamp.

FIG. 16B shows a top view of the end clamp 400 showing the features as described above while FIG. 16C shows a bottom view of the end clamp 400. The bottom view shows the entirety of the bottom jaw 430 with the aperture 470 and grooves 425. The head 485 of the t-bolt 490 is shown having been inserted through the aperture 470.

Figure 17:
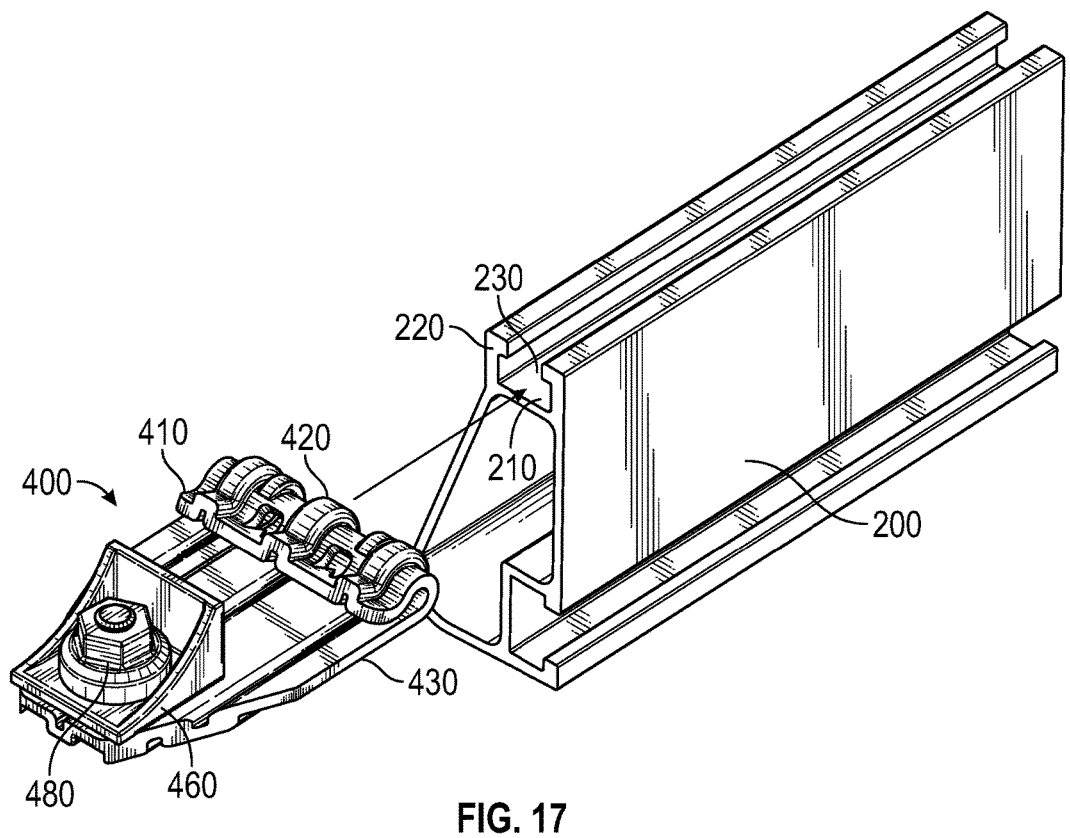
FIG. 17 illustrates a perspective view of the elongated clamp as it moves toward the guide of the rail support structure.
Figure 18:
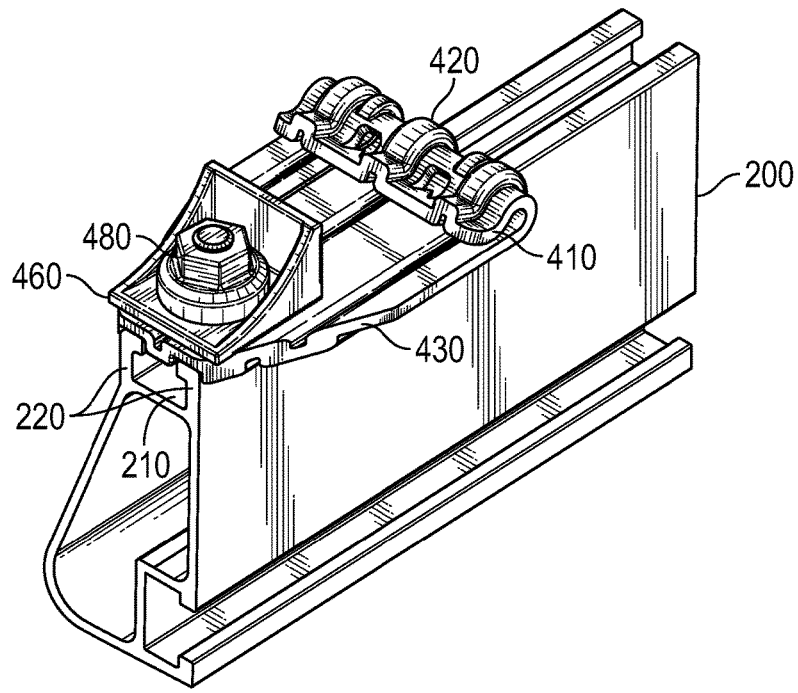
FIG. 18 illustrates a perspective view of the elongated clamp installed on the guide of the rail support structure.
Figure 19:
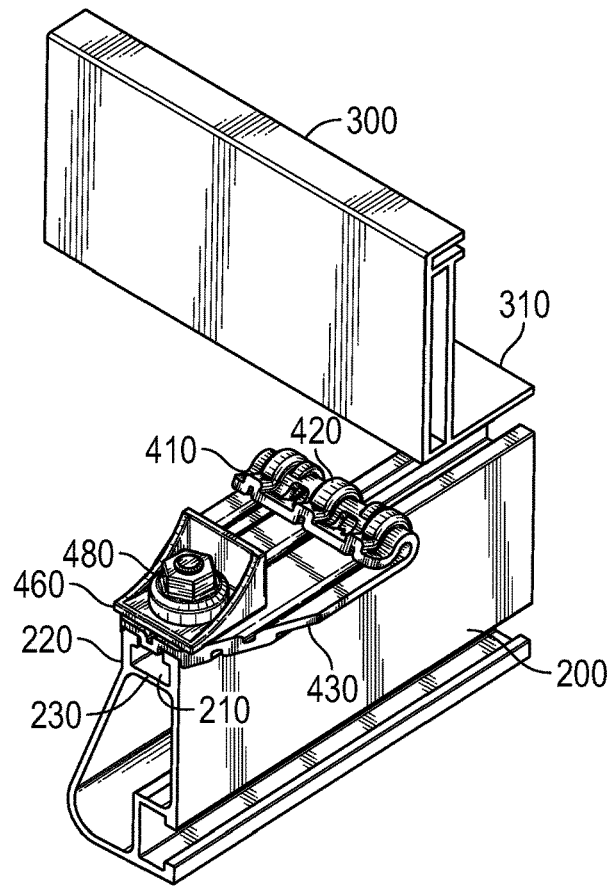
FIG. 19 illustrates the perspective view of FIG. 18 showing a solar panel module prior to placing it on top of the elongated end clamp.

As it was with the end clamp 100, the purpose of the end clamp 400 is to secure a solar panel module to a rail support structure. FIG. 19 shows a typical configuration with a rail support structure 200 and a solar panel module 300 that includes a flange 310 on its lower end. Just as with the end clamp 100, the end clamp 400 is positioned in the guide 210 of the rail support 200 as shown in FIGS. 17 and 18 along the grooves 425 where it can move bi-directionally along the guide 210.

Figure 20:
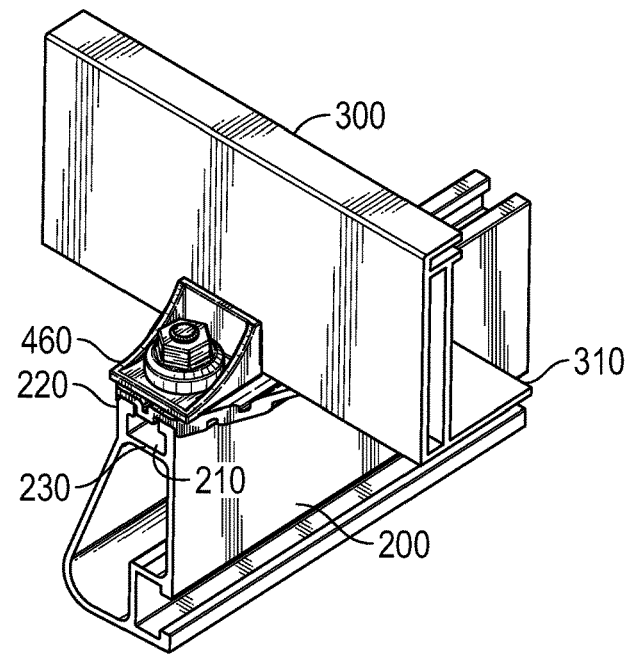
FIG. 20 illustrates the same view of FIG. 19 showing the clamp fully engaged with the lower flange of the solar panel module.

The process of securing the solar panel module 300 to the rail support 200 in this embodiment is accomplished by placing the solar panel module 300 on top of the bottom jaw 430 so that the lower flange 310 is generally perpendicular to the guide 210 as shown in FIG. 20.

Figure 21:
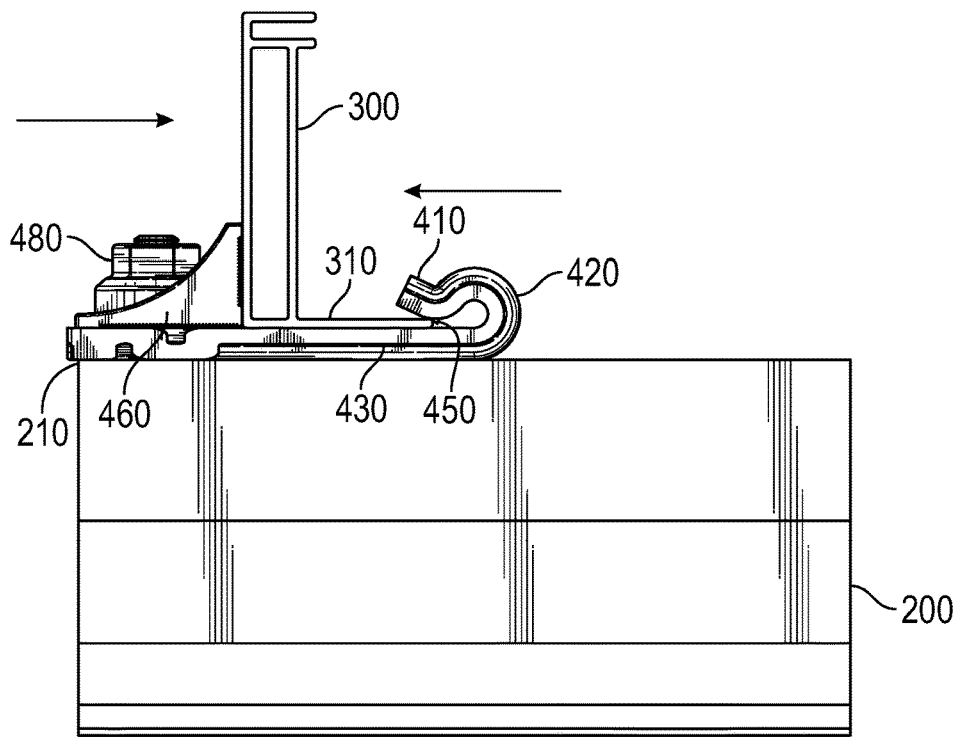
FIG. 21. Illustrates a side view of FIG. 20.
Figure 22:
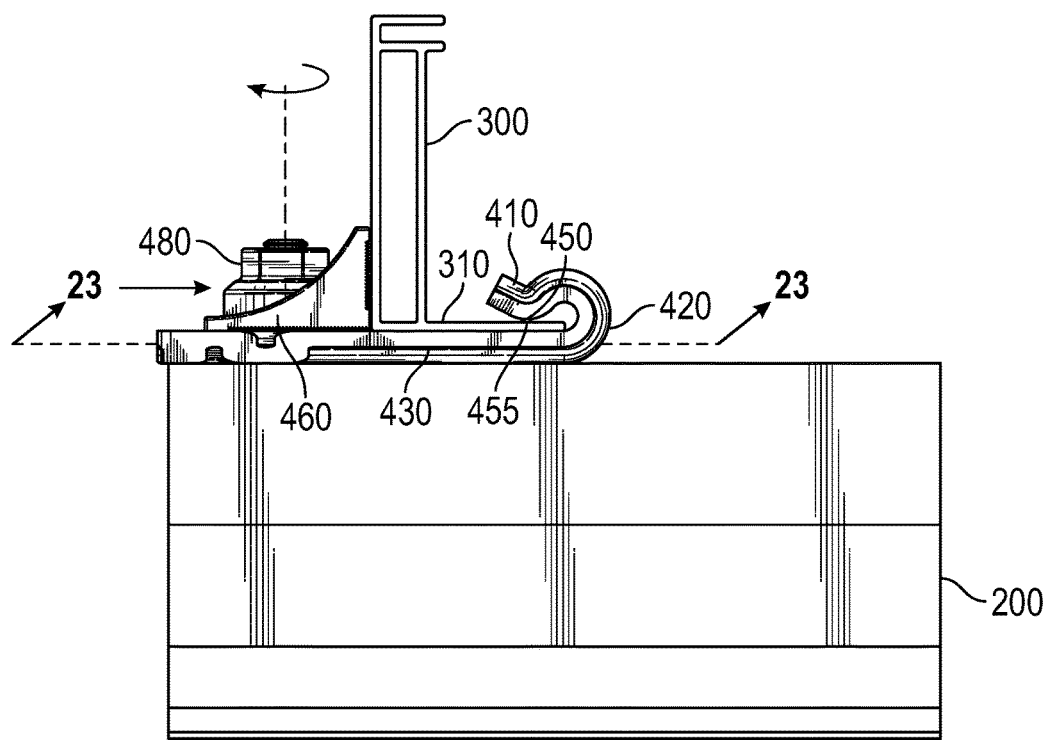
FIG. 22 illustrates the same view as FIG. 21 showing the nut on the t-bolt being tightened.

FIG. 21 shows a side view of the configuration. The lower flange 310 of the solar panel module 300 is then inserted the through the mouth of the top jaw 410 and bottom jaw 430 of the end clamp 400 so that the end clamp 400 forms a tight grip of the lower flange 310 as the top jaw 410 of the end clamp 400 engages the top surface of the lower flange 310, and the bottom jaw 430 engages the bottom surface of the lower jaw 430. The vertical face 465 of the optional back support 460 engages the rear surface 350 of the solar panel module 300 providing further support of the module 300.

Figure 23:
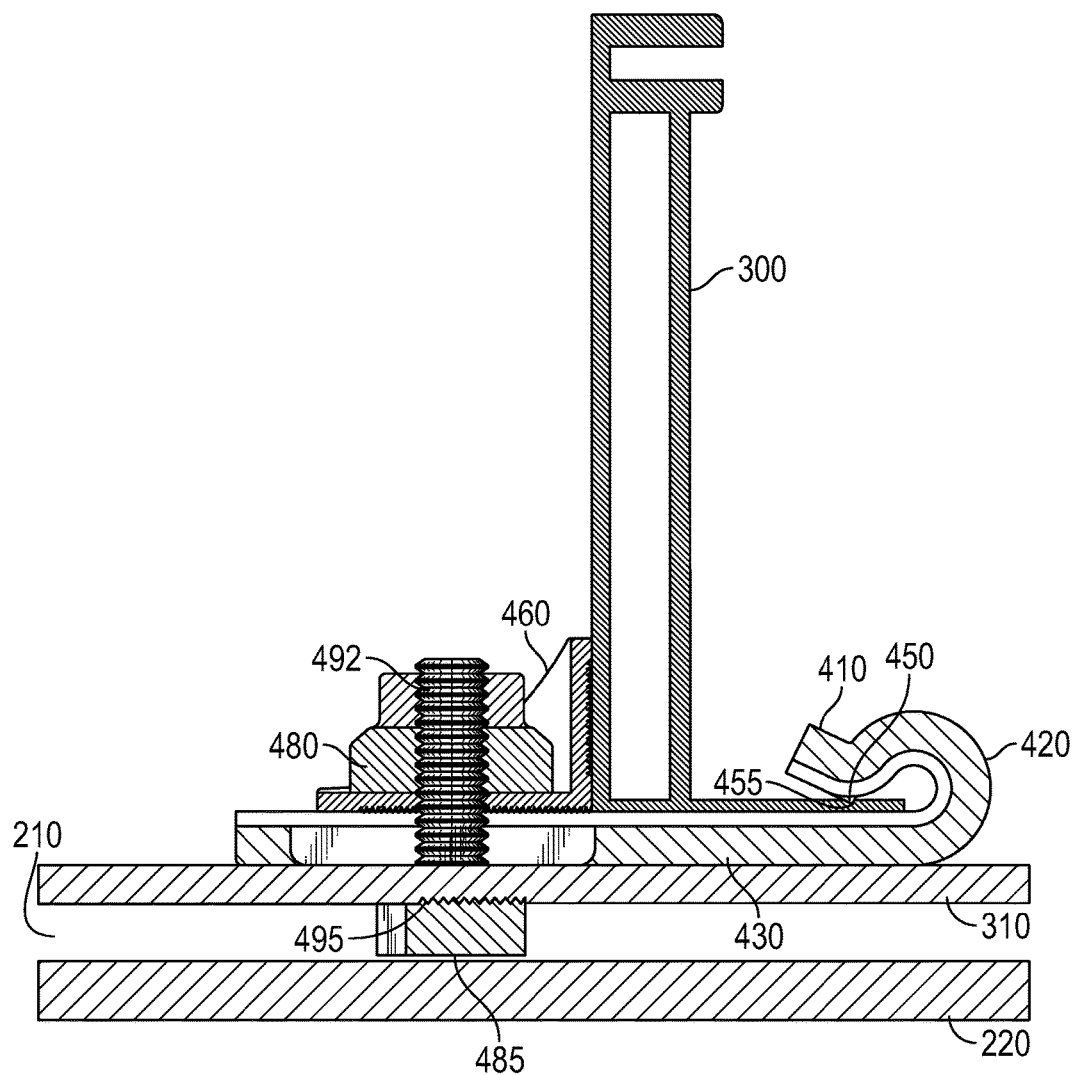
FIG. 23 illustrates a cross-sectional view of FIG. 21.

FIG. 23 shows a cross-sectional view (23-23) from FIG. 21. The points 455 of the raised portions 450 are then deflected slightly upward and form a tight grip on the top surface of the lower flange 310. The deflection allows the end clamp 400 to continue to move along toward the solar panel module 300 until the lower flange 310 engages the rear end 420 of the end clamp 400. As they did with the clamp 100 discussed previously, once engaged, the sharp points 455 penetrate the outer surface layer of the lower flange 310.

Figure 25:
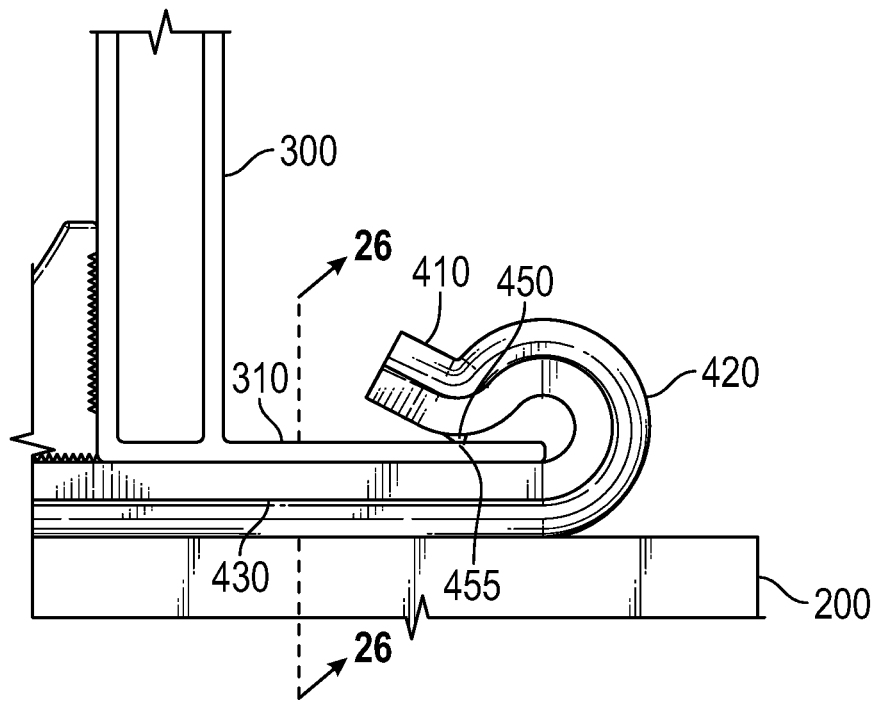
FIG. 25 illustrates a side view of the clamp with the solar panel module inserted into the clamp.
Figure 26:
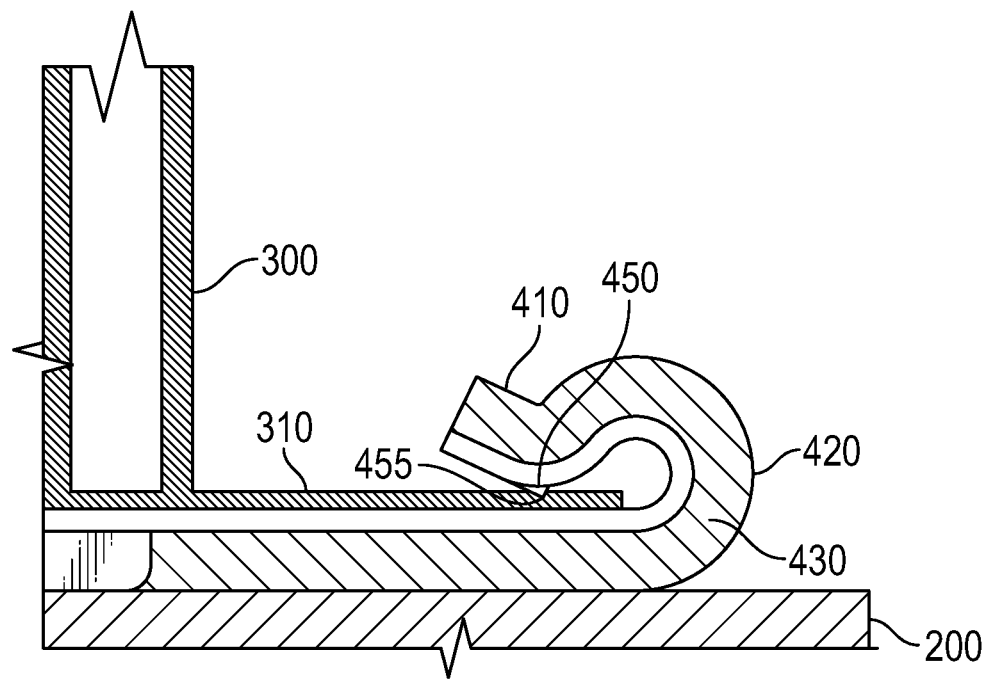
FIG. 26 illustrates a cross-sectional view of (26-26) from FIG. 25.

As shown in FIGS. 25 and 26, once penetration of the surface layer occurs, the combination of the rearward-pointing angle of the raised portions 450 with the force of the grip formed between the top jaw 410 and the bottom jaw 430, allow the points 455 to resist any attempt to pull the end clamp 400 away from the solar panel module 300 essentially locking the solar panel module 300 in place.

As shown in FIG. 23, the t-bolt 490 is inserted through the aperture 468 of the optional back support 460 and through the aperture 470 of the bottom jaw 430 into the guide 210. The nut 480 is then placed on the threaded portion of the t-bolt 490 and turned clockwise so that the t-bolt 490 engages the inner walls of the guide 210. The raised portions 492 on the outer edges of the t-bolt 490 cause the t-bolt 490 to stop rotating so that the nut 480 can continue to turn and tighten the bottom jaw 430 to the guide 210 of the rail support 200 as shown in FIG. 23 thereby creating an electrical conducting path from the solar panel module 300 to the rail support 200 through the end clamp 400.

Figure 24:
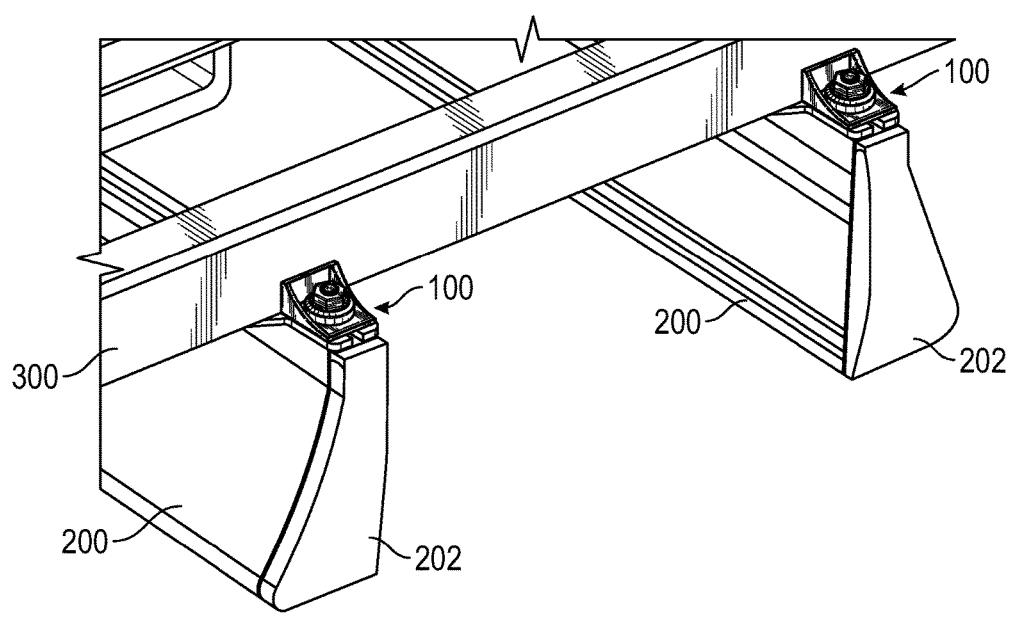
FIG. 24 illustrates a perspective view of a completed assembly.

The end clamp 400 can be released and removed from the end clamp 400 by pulling the top jaw 410 and the bottom jaw 430 apart so that the raised portions 450 disengage from the lower flange 310. This process is repeated until all end clamps 400 are installed. FIG. 24 shows the solar panel module 300 as it rests on two distinct rail supports 200 After the first row is installed, each subsequent row is installed by repeating the process described above.

What is claimed is:

1. A clamp for securing a solar panel module to a rail support and providing an electrical conducting path between them comprising:
   a. a rear end;
   b. a top jaw;
      i. the top jaw further comprising a bottom side;
      ii. a raised portion extending outward from the bottom side toward the rear end at an acute angle with respect to the bottom side of the top jaw and terminating at a point; and
   c. a bottom jaw coupled to the top jaw at the rear end wherein the top jaw and bottom jaw form an opening for receiving a portion of the solar panel module;
   d. a pair of separate bottom side flanges each extending from the rear end on opposite sides of the bottom jaw;
   e. a pair of apertures between the bottom side flanges and the bottom jaw that extend from the end of the bottom jaw to a portion of the rear end; and
   f. the bottom jaw being configured for insertion into, and movement within a guide on the rail support, the bottom jaw further comprising at least one sharp edge.

2. The clamp of claim 1 wherein the point is configured to penetrate a surface layer of the solar panel module.

3. The clamp of claim 1 wherein the top and bottom jaws provide sufficient downward and upward forces respectively to grip the portion of the solar panel module after receiving it and enable the point to penetrate a surface layer of the portion of the solar panel module.

4. The clamp of claim 1 wherein the top and bottom jaws are flanges.

5. The clamp of claim 1 wherein the clamp is made from an electrically conducting material.

6. The clamp of claim 1 wherein the top and bottom jaws provide sufficient downward and upward forces respectively to grip the portion of the solar panel module after receiving it and enable the sharp edge to penetrate a surface layer of the guide on the rail support.

* * * * *